US010424957B2

(12) United States Patent
Ghabra et al.

(10) Patent No.: US 10,424,957 B2
(45) Date of Patent: Sep. 24, 2019

(54) METHODS AND SYSTEMS FOR HANDLING PASSIVE ENTRY PASSIVE START (PEPS) REMOTE CONTROLLER BATTERY SELF-DISCHARGE

(71) Applicant: Lear Corporation, Southfield, MI (US)

(72) Inventors: Riad Ghabra, Northville, MI (US); Chadi Shaya, Macomb, MI (US); Robert Mariani, Troy, MI (US); Osman Ahmed, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/381,579

(22) Filed: Apr. 11, 2019

(65) Prior Publication Data

US 2019/0237982 A1   Aug. 1, 2019

Related U.S. Application Data

(62) Division of application No. 15/626,296, filed on Jun. 19, 2017, now Pat. No. 10,381,850.

(51) Int. Cl.
*G08B 21/02* (2006.01)
*H02J 7/00* (2006.01)
*B60R 25/40* (2013.01)

(52) U.S. Cl.
CPC .......... *H02J 7/0047* (2013.01); *B60R 25/406* (2013.01); *H02J 7/0054* (2013.01); *H02J 2007/005* (2013.01)

(58) Field of Classification Search
CPC .. G01R 31/3662; H02J 7/0047; H02J 7/0031; H02J 7/0073; Y02E 60/12
See application file for complete search history.

(56) References Cited

U.S. PATENT DOCUMENTS

| | | | | |
|---|---|---|---|---|
| 6,051,958 | A * | 4/2000 | Hwang | H01M 10/46 320/161 |
| 6,271,642 | B1 * | 8/2001 | Dougherty | G08B 29/181 320/104 |
| 6,291,968 | B1 * | 9/2001 | Nantz | H02J 7/0054 320/108 |
| 6,700,352 | B1 * | 3/2004 | Elliott | H02J 7/0003 320/130 |
| 7,018,736 | B2 | 3/2006 | Nakajima et al. | |
| 7,463,134 | B1 | 12/2008 | Stilley | |

(Continued)

*Primary Examiner* — Munear T Akki
(74) *Attorney, Agent, or Firm* — Brooks Kushman P.C.

(57) ABSTRACT

A fob for a passive entry passive start (PEPS) system includes a LF receiver, an UHF transmitter, an UWB transceiver, a primary battery to power the receiver and the transmitter, a rechargeable secondary battery to power the transceiver, and a controller. The controller may cause the primary battery to recharge the secondary battery when the secondary battery has a low charge. The controller may cause the transmitter to transmit an indication to a base station of the PEPS system that the primary battery has a low charge. This indication is to alert a user to replace the primary battery. The controller may cause the transmitter to transmit an indication that the secondary battery is dead when the secondary battery is detected to be dead. This indication is to alert the base station that PEPS communications of the fob will not involve the transceiver.

15 Claims, 4 Drawing Sheets

(56) References Cited

U.S. PATENT DOCUMENTS

| | | | | |
|---|---|---|---|---|
| 9,774,210 | B1* | 9/2017 | Wright | G08C 17/02 |
| 2005/0134477 | A1* | 6/2005 | Ghabra | B60R 25/246 |
| | | | | 340/13.24 |
| 2006/0132091 | A1* | 6/2006 | Felder | H02J 7/0086 |
| | | | | 320/128 |
| 2006/0255908 | A1* | 11/2006 | Gilbert | B60R 25/24 |
| | | | | 340/5.61 |
| 2007/0040449 | A1* | 2/2007 | Spurlin | A61M 5/1723 |
| | | | | 307/64 |
| 2009/0146610 | A1* | 6/2009 | Trigiani | H02J 7/0018 |
| | | | | 320/119 |
| 2012/0235823 | A1* | 9/2012 | Trock | H01M 10/48 |
| | | | | 340/636.1 |
| 2013/0143594 | A1* | 6/2013 | Ghabra | H04W 24/00 |
| | | | | 455/456.1 |
| 2013/0237174 | A1* | 9/2013 | Gusikhin | H04W 4/90 |
| | | | | 455/404.1 |
| 2014/0114503 | A1* | 4/2014 | Ghabra | H04Q 9/00 |
| | | | | 701/2 |
| 2014/0285319 | A1 | 9/2014 | Khan et al. | |
| 2016/0101745 | A1* | 4/2016 | Siswick | H04L 67/125 |
| | | | | 701/2 |
| 2016/0182548 | A1 | 6/2016 | Ghabra et al. | |
| 2016/0332598 | A1 | 11/2016 | Ghabra et al. | |

* cited by examiner

METHODS AND SYSTEMS FOR HANDLING PASSIVE ENTRY PASSIVE START (PEPS) REMOTE CONTROLLER BATTERY SELF-DISCHARGE

CROSS-REFERENCE TO RELATED APPLICATIONS

This application is a divisional of U.S. application Ser. No. 15/626,296, filed Jun. 19, 2017, now U.S. Pat. No. 10,381,850; the disclosure of which is hereby incorporated in its entirety by reference herein.

TECHNICAL FIELD

The present disclosure relates to passive entry passive start (PEPS) systems.

BACKGROUND

Passive entry passive start (PEPS) systems include a portable remote controller and a base station. The remote controller, such as a fob, is carried by a user. The base station is at a target device. The fob and the base station wirelessly communicate with one another for remote control of the target device.

SUMMARY

A fob for a passive entry passive start (PEPS) system includes a receiver, a transmitter, a transceiver, a primary battery to power the receiver and the transmitter, a secondary battery to power the transceiver, and a controller. The secondary battery is rechargeable and the primary battery is to recharge the secondary battery. The controller is to detect a charge status of the secondary battery and cause the primary battery to recharge the secondary battery when the secondary battery is detected to have a low charge status.

The transceiver may be an ultra-wide-band (UWB) transceiver. The receiver may be a low-frequency (LF) receiver and the transmitter may be an ultra-high frequency (UHF) transmitter.

The receiver may receive a wakeup signal, the transmitter may transmit an authorization signal, and the transceiver may communicate time-of-flight (ToF) ranging signals.

The controller may wait a period and recheck the charge status of the secondary battery after the secondary battery has been detected to have a high charge status and cause the primary battery to recharge the secondary battery when the secondary battery is rechecked to have the low charge status.

The primary battery may be replaceable and the secondary battery may be non-replaceable.

The controller may detect a charge status of the primary battery and cause the transmitter to transmit an indication to a base station of the PEPS system that the primary battery has a low primary battery charge status when the primary battery is detected to have the low primary battery charge status. The indication is to alert a user to replace the primary battery.

The controller may cause the transmitter to transmit an indication that the secondary battery is dead when the secondary battery is detected to have a dead battery charge status. The indication is to alert a base station of the PEPS system that PEPS communications between the fob and the base station will not involve the transceiver.

A fob for a PEPS system includes a receiver, a transmitter, a transceiver, a primary battery to power the receiver and the transmitter, a secondary battery to power the transceiver, and a controller. The secondary battery is rechargeable and the primary battery is to recharge the secondary battery. The controller is to detect a charge status of the primary battery and cause the transmitter to transmit an indication to a base station of the PEPS system that the primary battery has a low charge status when the primary battery is detected to have the low charge status, the indication to alert a user to replace the primary battery.

A fob for a PEPS system includes a receiver, a transmitter, a transceiver, a primary battery to power the receiver and the transmitter, a secondary battery to power the transceiver, and a controller. The secondary battery is rechargeable and the primary battery is to recharge the secondary battery. The controller is to detect a charge status of the secondary battery and cause the transmitter to transmit an indication that the secondary battery is dead when the secondary battery is detected to be dead, the indication to alert a base station of the PEPS system that PEPS communications between the fob and the base station will not involve the transceiver.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
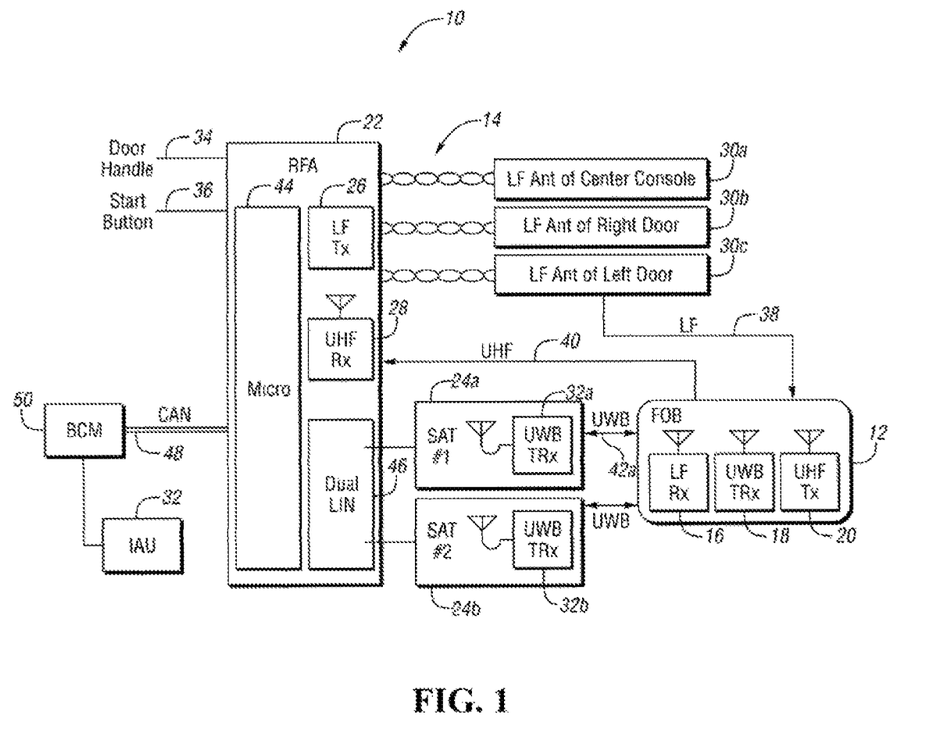
FIG. 1 illustrates a block diagram of a remote control system having a portable remote controller and a base station configured to communicate with one another to enable the remote controller to remotely control a target device via the base station.

Referring now to FIG. 1, a block diagram of a remote control system 10 is shown. Remote control system 10 includes a portable remote controller 12 and a base station 14. Remote controller 12 is a portable device such as a key fob ("fob") 12 to be carried by a user. Alternatively, remote controller 12 is a smart phone, a tablet, a wearable device such as a smart watch, or the like. Base station 14 is at a target device which is assumed herein to be a vehicle. Alternatively, the target device is a house, a garage, a gate, a building, a door, a lighting system, or the like.

Base station 14 is configured to be able to control functions of the vehicle. Fob 12 and base station 14 are operable for wirelessly transmitting/receiving signals to/from one another to enable the fob to remotely control the vehicle via the base station.

Remote control system 10 is configured to perform passive entry passive start (PEPS) functions. PEPS capability enables fob 12 to remotely control the vehicle automatically (or "passively") without user actuation of the fob. As an example of a passive entry function, base station 14 unlocks a vehicle door in response to the presence of fob 12 being brought into the vicinity of the vehicle being detected. Base station 14 can detect the presence of fob 12 being brought into the vicinity of the vehicle when a user carrying the fob touches a door handle of the vehicle. As an example of a passive start function, base station 14 starts the vehicle upon a user in possession of fob 12 pressing a start button on the vehicle dashboard.

Remote control system 10 may be further configured to perform remote keyless entry (RKE) functions. RKE capability enables fob 12 to remotely control the vehicle in response to user actuation of buttons or the like of the fob. As an example of a RKE function, base station 14 unlocks a vehicle door in response to receiving a vehicle door unlock command from fob 12. Fob 12 transmits the vehicle door unlock command to base station 14 in response to corresponding user actuation of the fob.

In regards to conducting PEPS functions, fob 12 and base station 14 engage in a series of (i) wakeup, (ii) authorization/authentication ("authorization"), and (iii) time of flight ("ToF") communications. The wakeup communications between fob 12 and base station 14 involve "waking up" the fob. The wakeup communications commence upon detecting a user action such as touching a door handle or pressing the vehicle start button.

The authorization communications between fob 12 and base station 14 take place once the fob is woken up. The authorization communications involve authorizing the enablement of a vehicle function (e.g., unlocking a vehicle door or starting the vehicle) corresponding to the detected user action. The authorization communications are intended to verify that fob 12 is authorized for remotely controlling the vehicle.

The ToF communications between fob 12 and base station 14 are for confirming that the fob is within the vicinity of the vehicle. The ToF communications are used to prevent a relay attack. The ToF communications involve measuring time for a signal to travel between fob 12 and base station 14. The rate of time at which the signal travels is known. As such, the time for the signal to travel between fob 12 and base station 14 is a function of the distance between the fob and the base station. Therefore, if the time for the signal to travel between fob 12 and base station 14 is too long, then the fob cannot be within vicinity of the vehicle. In this case, the enablement of the vehicle function is prevented even when the authorization communications authorize the enablement of the vehicle function. The enablement of the vehicle function is prevented because the authorization communications authorizing the enablement of the vehicle function may be the subject of a relay attack. The fact that the authorization communications may be being subjected to a relay attack is discerned from detecting the ToF between fob 12 and base station 14 being too long.

Thus, base station 14 does not perform the corresponding vehicle function (e.g., unlocking the vehicle door, starting the engine) whenever the ToF communications indicate that fob 12 is not within the vicinity of the vehicle. On the other hand, base station 14 performs the corresponding vehicle function when (i) the authorization communications verify that fob 12 is authorized for remotely controlling the vehicle and (ii) the ToF communications verify that the fob is within the vicinity of the vehicle.

As shown in FIG. 1, fob 12 includes a low-frequency (LF) receiver 16, an ultra-wide band (UWB) transceiver (transmitter/receiver) 18, and an ultra-high frequency (UHF) transmitter 20. LF receiver 16 is operable for receiving LF signals from base station 14. UWB transceiver 18 is operable for transmitting/receiving UWB signals to/from base station 14. UHF transmitter 20 is operable for transmitting UHF signals to base station 14.

As examples, the LF operating frequency range is between 20 to 300 kHz; the UWB operating frequency range is between 3 to 10 GHz including a preferred 3.5 to 6.5 GHz operating range; and the UHF operating frequency range is between 300 MHz to 3 GHz including a preferred 300 MHz to 1 GHz operating range.

As further shown in FIG. 1, base station 14 includes a remote function actuator (RFA) ("controller") 22 and a first satellite 24a. Base station 14 may include further satellites such as a second satellite 24b. Controller 22 and satellites 24a and 24b are located at the vehicle. Satellites 24a and 24b are positioned at respective locations of the vehicle (e.g., the right vehicle side and the left vehicle side).

Controller 22 includes a LF transmitter 26 and a UHF receiver 28. LF transmitter 26 is associated with one or more antennas such as antennas 30a, 30b, and 30c. Antennas 30a, 30b, and 30c are positioned at respective locations of the vehicle (e.g., center console, right vehicle door, left vehicle door). LF transmitter 26 is operable for transmitting LF signals via antennas 30a, 30b, and 30c to fob 12. UHF receiver 28 is operable for receiving UHF signals from fob 12. Satellites 24a and 24b include respective UWB transceivers 32a and 32b. UWB transceivers 32a and 32b are operable for transmitting/receiving UWB signals to/from fob 12.

The wakeup, authorization, and ToF communications between fob 12 and base station 14 take place using LF receiver 16, UWB transceiver 18, and UHF transmitter 20 of the fob, LF transmitter 26 and UHF receiver 28 of controller 22, and UWB transceiver 32a of first satellite 24a. The wakeup, authorization, and ToF communications between the receivers, transmitters, and transceivers of fob 12, controller 22, and first satellite 24a will now be described. (UWB transceiver 32b of second satellite 24b may also be used for ToF communications, but its description will be omitted for simplicity.)

Controller 22 initiates the wakeup communications process in response to detecting a user action such as touching a door handle or pressing the vehicle start button. In this regard, controller 22 includes a door handle detection input 34 and a vehicle start button detection input 36. Upon the user action being detected, LF transmitter 26 of controller 22 transmits a LF wakeup signal along LF communications link 38 for receipt by fob 12. Fob 12 wakes up in response to LF receiver 16 of the fob receiving the LF wakeup signal. In turn, UHF transmitter 20 of fob 12 transmits an UHF acknowledgement signal along UHF communications link 40 for receipt by controller 22.

Controller 22 commences the authorization communications upon UHF receiver 28 of controller 22 receiving the UHF acknowledgement signal. The authorization communications commence with LF transmitter 26 of controller 22 transmitting a LF encrypted challenge signal along LF communications link 38 for receipt by fob 12. Fob 12 generates a response for responding to the challenge signal upon LF receiver 16 of the fob receiving the LF challenge signal. In turn, UHF transmitter 20 of fob 12 transmits an UHF encrypted response along UHF communications link 40 for receipt by controller 22.

UHF receiver 28 of controller 22 receives the UHF encrypted response. Controller 22 analyzes the response from fob 12 to determine whether the response satisfies the challenge signal. If the response from fob 12 satisfies the challenge signal, then controller 22 determines the fob to be authorized for remotely controlling the vehicle. Controller 22 authorizes enablement of a vehicle function (e.g., unlocking a vehicle door or starting the vehicle) corresponding to the detected user action upon determining that fob 12 is authorized.

The ToF communications commence by UWB transceiver 18 of fob 12 transmitting a UWB initial ping signal along UWB communications link 42a for receipt by first satellite 24a. UWB transceiver 32a of first satellite 24a in response to receiving the UWB ping signal transmits a UWB request signal (e.g., a UWB ranging acknowledgment signal) along UWB communications link 42a for receipt by fob 12. Upon receiving the UWB ranging acknowledgment signal, UWB transceiver 18 of fob 12 transmits a UWB reply signal (e.g., a UWB ranging data signal) along UWB communications link 42a for receipt by first satellite 24a.

After UWB transceiver 32a of first satellite 24a receives the UWB reply signal, controller 22 measures the time duration from transmission of the UWB request signal by first satellite 24a to receipt of the UWB reply signal by the first satellite. If the time duration is longer than a predetermined time duration corresponding to a predetermined distance, then controller 22 determines that fob 12 is not within the vicinity of the vehicle (or, more accurately, not within the vicinity of first satellite 24a). Controller 22, during normal operations involving the ToF communications process, prevents the enablement of the vehicle function while fob 12 is determined to not be within the vicinity of the vehicle regardless of the authorization decision by the controller.

The same ToF communications process between fob 12 and first satellite 24a may be performed between the fob and second satellite 24b. This may be done to determine whether controller 22 is within the vicinity of the location of second satellite 24b.

As further shown in FIG. 1, controller 22 further includes a microcontroller 44 and a dual local interconnect network (LIN) 46. Microcontroller 44 monitors door handle detection input 34 and vehicle start button detection input 36 to detect user actuation of a door handle or the vehicle start button. Microcontroller 44 controls the transmitting and receiving operations of LF transmitter 26 and UHF receiver 28, respectively, in handling the wakeup and authorization communications processes of base station 14. Satellites 24a and 24b include microcontrollers which control the ToF communications process of the satellites. Microcontroller 44 communicates with the satellite microcontrollers via dual LIN 46 to learn from the ToF communications whether fob 12 is within the vicinity of the vehicle.

As further shown in FIG. 1, controller 22 may communicate via a vehicle network such as a CAN bus 48 with other vehicle controllers such as a body control module (BCM) 50. Through CAN bus 48 and BCM 50, controller 22 may communicate with an immobilizer antenna unit (IAU) 52. IAU 52 provides LF/LF immobilizer functions to fob 12 for backup starting (i.e., when the battery power of the fob is insufficient).

Figure 2:
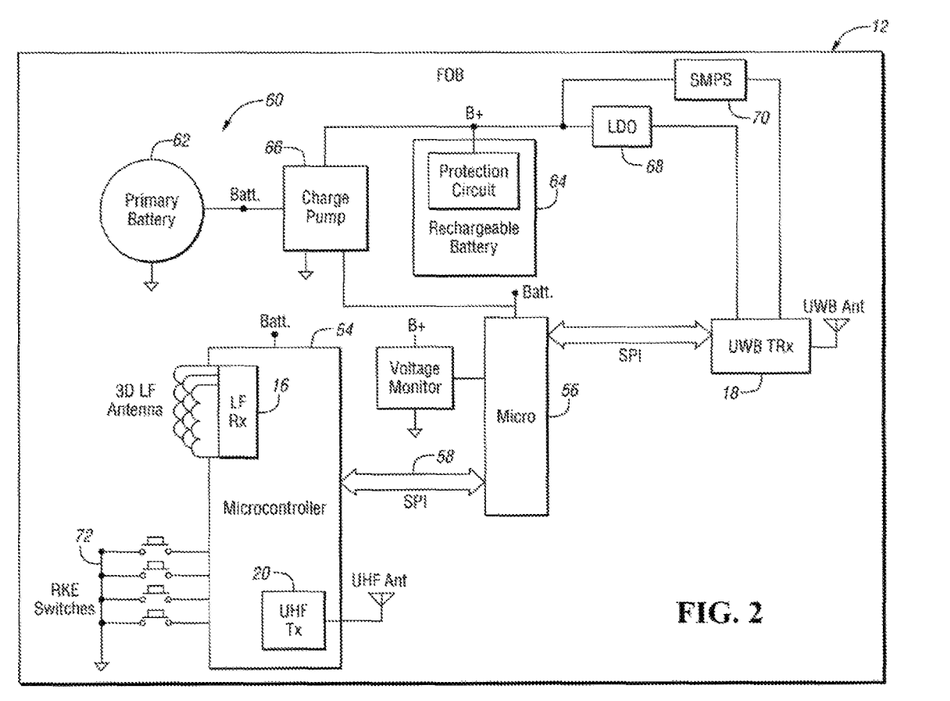
FIG. 2 illustrates a block diagram of the remote controller in greater detail, the remote controller including a primary battery that is replaceable and a secondary battery that is rechargeable.

Referring now to FIG. 2, with continual reference to FIG. 1, a block diagram of fob 12 in greater detail is shown. In addition to LF receiver 16, UWB transceiver 18, and UHF transmitter 20, fob 12 includes a first microcontroller 54 and a second microcontroller 56. First microcontroller 54 controls the receiving and transmitting operations of LF receiver 16 and UHF transmitter 20, respectively, in handling the wakeup and authorization communications of fob 12. Second microcontroller 56 controls the receiving and transmitting operations of UWB transceiver 18 in handling the ToF communications of fob 12.

First and second microcontrollers 54 and 56 communicate with one another via a serial peripheral interface (SPI) 58 in regards to the ToF communications. For instance, first microcontroller 54 enables second microcontroller 56 to transmit the UWB initial ping signal and the second microcontroller advises the first microcontroller of receipt of the UWB request signal and transmission of the UWB reply signal.

First microcontroller 54 of fob 12 further handles RKE functions of the fob. In this regard, first microcontroller 54 monitors RKE switch inputs 72.

Fob 12 further includes a battery arrangement 60 having a primary battery 62 and a secondary battery 64. Primary battery 62 provides battery power for enabling fob 12 to conduct the wakeup and authorization communications processes. Battery power (Batt) from primary battery 62 powers microcontrollers 54 and 56. Secondary battery 64 provides battery power for enabling fob 12 to conduct the ToF communications process.

Primary battery 62 is, for example, a standard, coin cell Lithium battery. Primary battery 62 is replaceable. That is, the mechanical assembly or housing of fob 12 is configured to allow a user to remove primary battery 62 from the fob and insert into the fob a new primary battery in place of the removed primary battery. In this way, primary battery 62 may be replaced after its battery charge is depleted to an insufficient low battery charge level such as when the primary battery is dead.

Secondary battery 64 is a rechargeable battery. Secondary battery 64 is rechargeable with battery power from primary battery 62. Secondary battery 64 is non-replaceable. That is, the mechanical assembly of fob 12 is configured to not accommodate for the typical user to remove secondary battery 64 from the fob and insert into the fob a new secondary battery. (In other embodiments, secondary battery 64 may be replaceable in like manner as primary battery 62.)

Battery arrangement 60 further includes a charge pump 66, a low-dropout (LDO) regulator 68, and a switched mode power supply (SMPS) 70 for the recharging and discharging operations of secondary battery 64.

As described herein, the ToF communications process involves UWB transceiver 18 of fob 12 conducting UWB communications operations. The UWB communications operations require that UWB transceiver 18 be provided with a relatively large spike of battery power (e.g., a relatively large electrical current draw in a relatively short amount of time) to communicate the UWB communications.

Primary battery 62 is not the type of battery that can provide the battery power spike (i.e., a high battery current during a short time) required for the UWB communications process. However, when sufficiently charged, secondary battery 64 can provide the high battery current required for the UWB communications operations. Secondary battery 64 provides the high battery current to UWB transceiver 18 of fob 12 when UWB transceiver 18 is communicating UWB signals. UWB transceiver 18 requires the high battery current for its operation to receive/transmit UWB signals during the ToF communications process. The ToF communications process occurs during a short time. As such, secondary battery 64 satisfies the power consumption requirement of UWB transceiver 18.

Secondary battery 64 discharges to become not sufficiently charged for being able to provide the high battery current after one or a few occurrences of having provided the high battery current. Therefore, secondary battery 64, which is rechargeable, is recharged with battery power from primary battery 62 after the secondary battery discharges during the UWB communications operations. In this way, secondary battery 64 becomes or is maintained sufficiently charged to provide the high battery current for subsequent UWB communications operations.

In sum, fob 12 contains UWB transceiver 18 which is powered by a very small, non-replaceable, rechargeable battery (i.e., secondary battery 64). In course of normal operation, secondary battery 64 is immediately recharged from the replaceable, standard battery (i.e., primary battery 62) after each PEPS activation or function involving UWB operation. An inherent characteristic of rechargeable batteries is self-discharge which is continually on going. A problem encountered is that when fob 12 is stored for a relatively long time (e.g., a couple of years), secondary battery 64 will slowly self-discharge to a point that it becomes unusable.

As described, remote control system 10 employs UWB technology for the purpose of foiling relay attack theft attempts of the vehicle. A problem is self-discharge of primary battery 62 and/or secondary battery 64 of fob 12 reducing the storage life of the fob. Methods and systems in accordance with embodiments handle the self-discharge battery issues to increase the storage life of fob 12 and/or to prevent or circumvent problems related to reduced storage life of fob 12. Such methods and systems are described in connection with FIGS. 3, 4, and 5.

Figure 3:
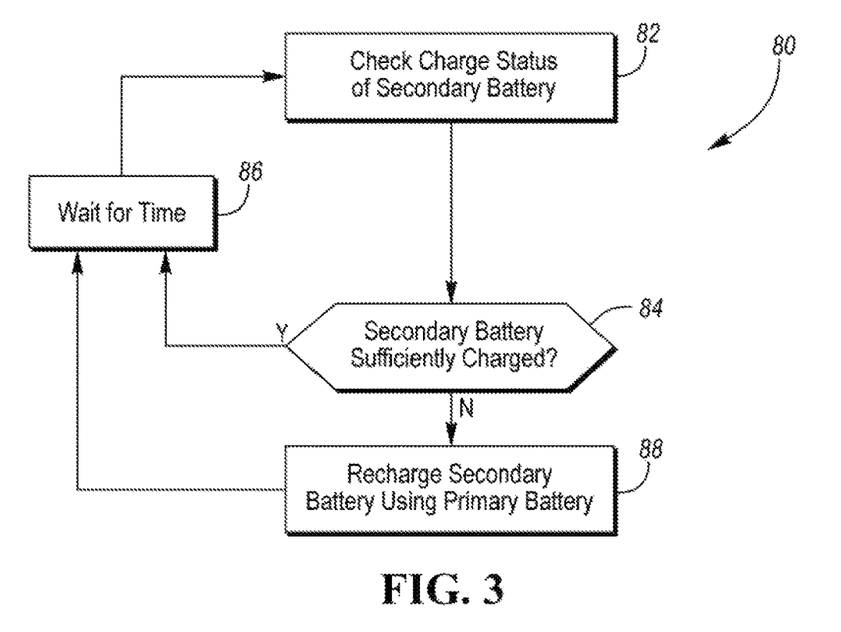
FIG. 3 illustrates a flowchart depicting an operation process of the remote controller involving detecting for a low charge status of the secondary battery while the remote controller is dormant and recharging the secondary battery with battery power from the primary battery upon the secondary battery being detected to have the low charge status.

Referring now to FIG. 3, with continual reference to FIGS. 1 and 2, a flowchart 80 depicting an operation process of fob 12 is shown. The operation process commences with a microcontroller of fob 12 such as second microcontroller 56 checking the charge status of secondary battery 64, as indicated in block 82. For instance, microcontroller 56 checks the charge status of secondary battery 64 after fob 12 has been dormant for some time. Microcontroller 56 checks the charge status of secondary battery 64 to detect whether the secondary battery has a low charge status, as indicated in decision block 84. A low charge status is, for example, a charge status in which secondary battery 64 is unable to provide the high battery current required for fob 12 to conduct the UWB communications operations, but can be recharged (i.e., the secondary battery is not dead or unusable). On the other hand, a high charge status is a charge status in which secondary battery 64 can provide the high battery current required for fob 12 to conduct the UWB communications operations and can be recharged.

If the charge status of secondary battery 64 is the high charge status, then microcontroller 56 repeats the step of checking charge status of secondary battery 64 after waiting for a predetermined time indicated in block 86. For instance, microcontroller 56 rechecks the charge status of secondary battery 64 once an hour, day, week, etc. Further, microcontroller 56 may vary the predetermined waiting time depending on a level of the detected charge status of secondary battery 64. For instance, if the detected charge status of secondary battery 64 is almost fully charged, then microcontroller 56 may wait one month instead of one week to recheck the charge status of the secondary battery. Likewise, if the detected charge status of secondary battery 64 is barely fully charged, then microcontroller 56 may wait one day instead of one week to recheck the charge status of the secondary battery.

If the charge status of secondary battery 64 is the low charge status, then microcontroller 56 controls primary battery 62 to recharge secondary battery 64 with battery power from the primary battery, as indicated in block 88. Microcontroller 56 recharges secondary battery 64 with enough battery power from primary battery 62 until the secondary battery is fully charged with the high charge status. After secondary battery 64 has been recharged, microcontroller 56 repeats the operation process by rechecking the charge status of secondary battery 64 after waiting for a predetermined time indicated in block 86.

The operation process of FIG. 3 thus involves a microcontroller of fob 12 periodically waking up to check the state of secondary battery 64 and recharge the secondary battery when necessary using battery power of primary battery 62 via, for instance, an ultra-low current timer.

Figure 4:
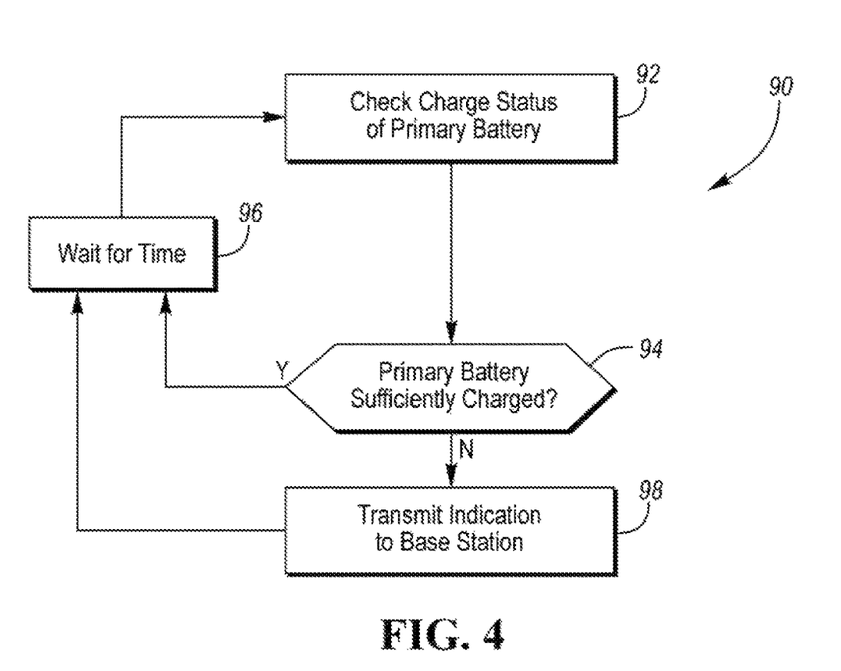
FIG. 4 illustrates a flowchart depicting an operation process of the remote controller involving detecting for a low charge status of the primary battery while the remote controller is dormant and communicating from the remote controller to the base station an indication of the low charge status of the primary battery after the primary battery is detected to have the low charge status.
Figure 5:
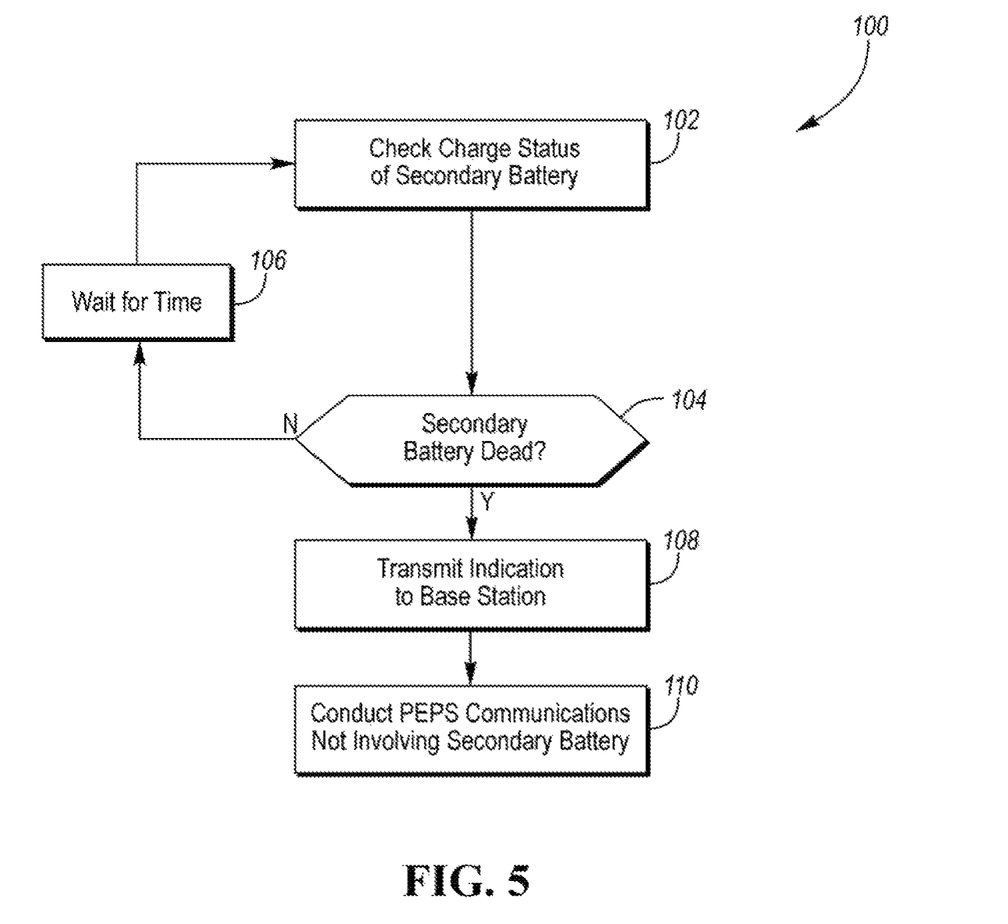
FIG. 5 illustrates a flowchart depicting an operation process of the remote control system involving detecting for a dead or unusable status of the secondary battery while the battery is dormant and, after the secondary battery is detected to be dead or unusable and upon the remote controller and the base station to communicate with one another for the remote controller to remotely control the target device, communicating from the remote controller to the base station an indication that the secondary battery is dead or unusable and conducting communications not involving use of the secondary battery between the remote controller and the base station for the remote controller to remotely control the target device.

The operation process of FIG. 3 prolongs the life of secondary battery 64. However, when fob 12 is stored for a relatively long time such as a few years, primary battery 62 will eventually die. Fob 12 would then be unable to recharge secondary battery 64 and the secondary battery would eventually self-discharge to a level at which it cannot be brought back to normal operation. FIGS. 4 and 5 describe operation processes which address this situation.

Referring now to FIG. 4, with continual reference to FIGS. 1, 2, and 3, a flowchart 90 depicting another operation process of fob 12 is shown. The operation process shown in FIG. 4 may be separate from or a part of the operation process shown in FIG. 3.

The operation process shown in FIG. 4 commences with a microcontroller of fob 12, such as second microcontroller 56, checking the charge status of primary battery 62, as indicated in block 92. For instance, microcontroller 56 checks the charge status of primary battery 62 after fob 12 has been dormant for some time. Microcontroller 56 checks the charge status of primary battery 62 to detect whether the primary battery has a low charge status, as indicated in decision block 94. A low charge status for primary battery 62 is, for example, a charge status in which the primary battery will likely become dead or unusable during ordinary use within a predicted time such as a few days, weeks, months, etc. Once primary battery 62 becomes dead, the primary battery will be unable to recharge secondary battery 64 and will need to be replaced.

If the charge status of primary battery 62 is not low, then microcontroller 56 repeats the step of checking charge status of the primary battery after waiting for a predetermined time indicated in block 96. For instance, microcontroller 56 checks the charge status of primary battery 62 once an hour, day, week, etc. Further, microcontroller 56 may vary the predetermined waiting time depending on a level of the detected charge status of primary battery 62.

If the charge status of primary battery 62 is the low charge status, then a microcontroller of fob 12 controls the fob to communicate to base station 14 an indication of the low charge status of the primary battery, as indicated in block 98. For instance, UHF transmitter 20 is controlled to transmit the indication of the low charge status of primary battery 62 to base station 14 via UHF communications link 40.

The indication of the low charge status of primary battery 62 is transmitted to base station 14 for the base station to advise a user of the vehicle of the low charge status of the primary battery. For instance, upon receiving from fob 12 the indication of the low charge status of primary battery 62, base station 14 controls a display of the vehicle to display the indication to alert the user. The user is alerted for the user to be advised that primary battery 62 should be replaced with a new battery as the primary battery will become dead in the relative near future.

After fob 12 transmits to base station 14 the indication of the low charge status of primary battery 62, microcontroller 56 repeats the step of checking charge status of primary battery 62 after waiting for a predetermined time indicated in block 96. The operation process then repeats. If the primary battery 62 with the low charge status was replaced with a new battery, then the detected charge status will not be the low charge status. Likewise, if the primary battery 62 with the low charge status has not been replaced, then the detected charge status will remain the low charge status and another indication of the low charge status of the primary battery will be transmitted to base station 14 to advise the user that the primary battery needs to be replaced.

The operation process of FIG. 4 thus involves a microcontroller of fob 12 periodically checking the state of primary battery 62 and transmitting an indication (such as via a RKE transmission) to the vehicle (via base station 14) at periodic very slow rates when the primary battery charge status is detected to be low. The indication is to try to display a message such as on the vehicle dashboard to prompt the user to replace primary battery 62. However, it may be that the vehicle is always out of range to receive the indication from the stored fob 12. FIG. 5 describes an operation process which addresses this situation.

Referring now to FIG. 5, with continual reference to FIGS. 1, 2, 3, and 4, a flowchart 100 depicting an operation process of remote control system 10 is shown. The operation process shown in FIG. 5 may be separate from or a part of either or both operation processes shown in FIGS. 3 and 4.

The operation process shown in FIG. 5 commences with a microcontroller of fob 12, such as second microcontroller 56, checking the charge status of secondary battery 64, as indicated in block 102. For instance, microcontroller 56 checks the charge status of secondary battery 64 after fob 12 has been dormant for some time. Microcontroller 56 checks the charge status of secondary battery 64 to detect whether the secondary battery is dead or unusable, as indicated in decision block 104. Secondary battery 64 cannot be recharged once it is dead or unusable.

If secondary battery 64 is not dead or unusable (i.e., if the charge status of the secondary battery is at least the low charge status or is the high charge status), then microcontroller 56 repeats the step of checking the charge status of secondary battery 64 after waiting for a predetermined time indicated in block 106. For instance, microcontroller 56 checks to detect whether secondary battery 64 is dead or unusable once an hour, day, week, etc. Further, microcontroller 56 may vary the predetermined waiting time depending on a level of the detected charge status of secondary battery 64.

If secondary battery 64 is dead or unusable, then a microcontroller of fob 12 controls the fob to communicate to base station 14 an indication that the fob is unable to perform communications involving the secondary battery, as indicated in block 108. For instance, UHF transmitter 20 is controlled to transmit to base station 14 via UHF communications link 40 the indication that fob 12 is unable to perform communications involving secondary battery 64.

As described herein, the ToF communications process involves UWB transceiver 18 of fob 12 conducting UWB communications operations with UWB transceiver 18 being powered with a high battery current from secondary battery 64. Secondary battery 64 is unable to provide the high battery current when the secondary battery is dead or unusable. Further, when secondary battery 64 is dead or unusable, the secondary battery is not even able to be recharged. As such, when secondary battery 64 is dead or unusable, fob 12 is unable to conduct the UWB communications operations that are part of the ToF communications process. Hence, the ToF communications process cannot take place when secondary battery 64 is dead or unusable.

The indication that fob 12 is unable to perform communications involving secondary battery 64 is thus an indication that the ToF communications process cannot take place between the fob and base station 14. Thus, in regards to subsequent PEPS actions, fob 12 and base station 14 engage in the wakeup and authorization communications without the ToF communications, as indicated in block 110. The wakeup and authorization communications do not involve use of secondary battery 64 as described herein.

In sum, in regards to PEPS capability, when secondary battery 64 of fob 12 is sufficiently charged, the fob and base station 14 engage in wakeup, authorization, and ToF communications. In regards to PEPS capability, when secondary battery 64 is dead or unusable, fob 12 and base station 14 may engage in wakeup and authorization communications without the ToF communications after the fob has notified the base station that the secondary battery is dead or unusable.

The operation process of FIG. 5 thus handles the situation when fob 12 is brought out for use after several years of storage with both primary battery 62 and secondary battery 64 being dead. The user will replace primary battery 62, but this will not help to operate the UWB communication as secondary battery 64 is dead and hence cannot be recharged. Since a microcontroller of fob 12 is now again able to check the health of secondary battery 64, the microcontroller will determine that the secondary battery is unusable. When a PEPS function involving UWB is requested (such as passive unlock or passive engine start), fob 12 will communicate to the vehicle (via base station 14) that the fob is unable to perform UWB communication. This communication may be performed via encrypted means to prevent an attacker from using the outlined solution to foil the security of remote control system 10. This signaling will revert remote control system 10 to using LF/UHF communication for performing the mutual authentication required for PEPS without using UWB.

UWB as described herein is an example of communications which can provide ToF capability. Other communication protocols which may be substituted in place of UWB for ToF capability include wide-band (WB) and Doppler.

While exemplary embodiments are described above, it is not intended that these embodiments describe all possible invention forms. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A fob for a passive entry passive start (PEPS) system for a vehicle, the fob comprising:
   a receiver and a transmitter;
   a transceiver;
   a primary battery to power the receiver and the transmitter;
   a secondary battery to power the transceiver, the secondary battery being rechargeable;
   the primary battery to recharge the secondary battery; and
   a controller to detect a charge status of the primary battery and cause the transmitter to transmit an indication to a vehicle base station of the PEPS system that the primary battery has a low charge status when the primary battery is detected to have the low charge status for the base station to control a display to display the indication to alert a user to replace the primary battery.

2. The fob of claim 1 wherein:
   the transceiver is an ultra-wide-band (UWB) transceiver.

3. The fob of claim 2 wherein:
   the receiver is a low-frequency (LF) receiver and the transmitter is an ultra-high frequency (UHF) transmitter.

4. The fob of claim 1 wherein:
   the receiver is to receive a wakeup signal, the transmitter is to transmit an authorization signal, and the transceiver is to communicate time-of-flight (ToF) ranging signals.

5. The fob of claim 1 wherein:
   the controller is further to wait a period and recheck the charge status of the primary battery after the primary battery has been detected to have a high charge status and cause the transmitter to transmit the indication to the base station that the primary battery has the low charge status when the primary battery is rechecked to have the low charge status.

6. The fob of claim 1 wherein:
   the primary battery is replaceable and the secondary battery is non-replaceable.

7. The fob of claim 1 wherein:
   the controller is further to detect a charge status of the secondary battery and cause the primary battery to recharge the secondary battery when the secondary battery is detected to have a low secondary battery charge status.

8. The fob of claim 1 wherein:
   the controller is further to detect a charge status of the secondary battery and cause the transmitter to transmit a second indication that the secondary battery is dead when the secondary battery is detected to have a dead battery charge status, the second indication to alert the base station that PEPS communications between the fob and the base station will not involve the transceiver.

9. A fob for a passive entry passive start (PEPS) system for a vehicle, the fob comprising:
   a receiver and a transmitter;
   a transceiver;
   a primary battery to power the receiver and the transmitter;
   a secondary battery to power the transceiver, the secondary battery being rechargeable;
   the primary battery to recharge the secondary battery;
   a controller to detect a charge status of the secondary battery and cause the transmitter to transmit an indication that the secondary battery is dead when the secondary battery is detected to be dead, the indication to alert a vehicle base station of the PEPS system that PEPS communications between the fob and the base station will not involve the transceiver; and
   wherein, following the base station being alerted that PEPS communications between the fob and the base station will not involve the transceiver, the receiver and the transmitter without the transceiver to conduct PEPS communications between the fob and the base station.

10. The fob of claim 9 wherein:
    the transceiver is an ultra-wide-band (UWB) transceiver.

11. The fob of claim 9 wherein:
    the receiver is a low-frequency (LF) receiver and the transmitter is an ultra-high frequency (UHF) transmitter.

12. The fob of claim 9 wherein:
    the receiver is to receive a wakeup signal, the transmitter is to transmit an authorization signal, and the transceiver is to communicate time-of-flight (ToF) ranging signals.

13. The fob of claim 9 wherein:
    the primary battery is replaceable and the secondary battery is non-replaceable.

14. The fob of claim 9 wherein:
    the controller is further to cause the primary battery to recharge the secondary battery when the secondary battery is not dead and is detected to have a low charge status.

15. The fob of claim 9 wherein:
    the controller is further to detect a charge status of the primary battery and cause the transmitter to transmit a second indication to the base station that the primary battery has a low charge status when the primary battery is detected to have the low charge status, the second indication to alert a user to replace the primary battery.

* * * * *